(12) United States Patent  Haran

(10) Patent No.: US 10,056,931 B2
(45) Date of Patent: Aug. 21, 2018

(54) DIGITAL REMOTE ANTENNAS OPERATION

(71) Applicant: AUTOTALKS LTD., Kfar Netter (IL)

(72) Inventor: Onn Haran, Bnei Dror (IL)

(73) Assignee: Autotalks LTD, Kfar Netter (IL)

( * ) Notice: Subject to any disclaimer, the term of this patent is extended or adjusted under 35 U.S.C. 154(b) by 0 days.

(21) Appl. No.: 15/339,963

(22) Filed: Nov. 1, 2016

(65) Prior Publication Data

US 2017/0237474 A1   Aug. 17, 2017

Related U.S. Application Data

(60) Provisional application No. 62/296,105, filed on Feb. 17, 2016.

(51) Int. Cl.
*H04B 1/3822* (2015.01)
*H04B 7/04* (2017.01)
*H04W 74/08* (2009.01)

(52) U.S. Cl.
CPC ............ *H04B 1/3822* (2013.01); *H04B 7/04* (2013.01); *H04W 74/0808* (2013.01); *H05K 999/99* (2013.01)

(58) Field of Classification Search
CPC ............ H04W 4/008; H04W 74/0808; H04W 74/0816; H04W 84/005; H04W 84/18; H01Q 1/32–1/3291; H04B 7/0404; H04B 7/04; H04B 7/0667; H04B 1/3822; H04L 67/12; H05K 999/99
See application file for complete search history.

(56) References Cited

U.S. PATENT DOCUMENTS

| 7,406,335 | B2 * | 7/2008 | Benning | H04B 7/0408 455/562.1 |
| 2006/0009232 | A1 * | 1/2006 | Vakil | H04W 16/04 455/453 |
| 2010/0046427 | A1 * | 2/2010 | Li | H04B 7/0686 370/328 |
| 2013/0249675 | A1 * | 9/2013 | van den Berge | G06K 7/0008 340/10.4 |
| 2015/0061946 | A1 * | 3/2015 | Martinez-Ortigosa | H01Q 9/0407 343/713 |
| 2016/0381571 | A1 * | 12/2016 | Koravadi | H04W 4/008 348/148 |
| 2017/0054204 | A1 * | 2/2017 | Changalvala | H01Q 1/3291 |
| 2017/0187435 | A1 * | 6/2017 | Cariou | H04W 74/008 |

FOREIGN PATENT DOCUMENTS

WO   2016115894 A1   7/2016
WO   2016155523 A1   10/2016

* cited by examiner

*Primary Examiner* — Raymond Dean
(74) *Attorney, Agent, or Firm* — Nathan & Associates; Menachem Nathan

(57) ABSTRACT

Apparatus and methods for vehicle-to-everything (V2X) communications, and in particular for vehicle-to-vehicle (V2V) communications. The apparatus comprises two remote antennas positioned in a vehicle and communicatively coupled by digital connectivity and a coordinator communicatively coupled to the two remote antennas and operative to synchronize operation of the two remote antennas.

20 Claims, 11 Drawing Sheets

KNOWN ART

DIGITAL REMOTE ANTENNAS OPERATION

CROSS REFERENCE TO RELATED APPLICATIONS

This application is related to and claims priority from U.S. Provisional Patent Application 62/296,105 having the same title and filed Feb. 17, 2016, which is incorporated herein by reference in its entirety.

FIELD

Embodiments of the invention relate generally to connectivity of multiple remote antennas, and in particular to synchronization between remote antennas using digital connectivity.

BACKGROUND

Vehicle-to-everything (V2X) communications, in particular vehicle-to-vehicle (V2V) communications, require reliable communication links toward all entities (e.g. vehicles) in proximity of a given vehicle. A known single antenna (numbered 100) is shown schematically in FIG. 1. The antenna includes a vehicular communication modem (802.11p MAC/PHY) 102 and an Ethernet interface (I/F) 104. Data arriving from an Ethernet interface from the protocol stack software layer (not shown) is transmitted over the air using modem 102, and vice versa.

In vehicles with a single antenna, the antenna may be at times blocked and/or fails to provide omnidirectional coverage. In such and other cases, some vehicles may have two antennas and therefore use V2X communication scenarios involving two antennas. The two antennas may be "remote antennas" in the sense that they located far from each other (and not in the same enclosure). For example, two remote antennas may be separated by a distance of 0.5 meter or more. In some cases, two remote antennas may be located in trucks or large vehicles. In other cases, two remote antennas may be hidden for styling reasons. FIG. 2A shows a truck 200 with two remote antennas 202 and 204 positioned at, respectively, the front and the rear of the truck. Typically, in known two remote antenna configurations, the two antennas are connected via a coaxial (Coax) cable to a centralized modem (i.e. a vehicular communication modem such as modem 102 above. However, Coax cables are expensive, have significant weight, and are hard to handle because of their limited bending radius. In addition, the amplification circuitry required to compensate Coax attenuation has inherent cost.

Digital connectivity is cheaper than Coax cabling since it can use a plain twisted pair cable. Cabling weight is lower, and there are no bending radius limitations. However, this comes with a penalty. Digital connectivity requires reception circuitry at each antenna, for translation of a modulated radio frequency (RF) signal to a digital signal. Digital connectivity may exchange modulated data such as IQ (in-phase and quadrature) samples. However, while modulated data connectivity may provide optimal diversity, signal bandwidth needs to be high and latency needs to be low. These requirements are hard to achieve, complicate the design, and (if existing at all) would be very expensive.

Another option with a two-antenna configuration is to exchange un-modulated data, i.e. decoded bits. At a receive side, the exchange of decoded bits would be trivial, at the expense of losing noise gain (3 dB) but benefiting from array gain (i.e. from the gain resulting from different antenna placements). At the transmit side, the challenge is to synchronize the start time of the two antennas, under the assumption that transmission from a single antenna will not meet the requirement of transmitting the signal to a required distance (for example 400 m) in any direction around the vehicle. The transmission start decision may be affected by information existing at only one antenna. For example, Clear Channel Assessment (CCA) may be asserted at one antenna but not asserted at the other. For example, exchanges of CCA status may be subject to latency.

The digital connectivity between the two antennas may be indirect, through switches. However, a private digital bus is not common in vehicles. Each switch adds latency, which is a great concern for the modulated data exchange or the updated CCA data.

There is therefore a need for and it would be advantageous to have apparatus and/or methods that overcome the above-mentioned limitations for having digital connectivity that exchanges un-modulated data (or "un-modulated data signals") between two remote antennas in a vehicle in V2X communications.

SUMMARY

In exemplary embodiments, there is provided apparatus for V2X communications, comprising two remote antennas positioned remotely from each other and communicatively coupled by digital connectivity, and a coordinator communicatively coupled to the two remote antennas and operative to synchronize operation of the two antennas. To clarify, "digital connectivity" as used herein refers to connectivity in communications exchanging only un-modulated data signals. Hereinafter and for simplicity, the term "remote antenna" may be used interchangeably with, and/or replaced by, the term "antenna".

According to an exemplary embodiment, wherein the coordinator includes a transmission scheduling module configured to schedule a concurrent future transmission time for the two remote antennas.

According to an exemplary embodiment, the coordinator further includes a timing distribution unit for distributing the concurrent future transmission time for the two remote antennas.

According to an exemplary embodiment, each antenna includes a timing control unit for receiving the future transmission time and for setting the future transmission time in each remote antenna.

According to an exemplary embodiment, the coordinator includes a duplicate prevention module configured to ensure that only a single copy of a packet is received from both remote antennas.

According to an exemplary embodiment, each remote antenna further includes a CCA exchange module for exchanging a CCA state with the other remote antenna through the coordinator.

According to an exemplary embodiment, the coordinator includes a link profiling module configured to establish an optimal time interval that includes the concurrent future transmission time.

According to an exemplary embodiment, the link profiling module is further configured to establish the CCA state at each remote antenna, the CCA state used to determine the optimal time interval.

According to an exemplary embodiment, each remote antenna includes a respective Ethernet interface and the coordinator includes two Ethernet interfaces for communicatively coupling the two remote antennas through their respective Ethernet interfaces.

According to an exemplary embodiment, an apparatus as described herein is included in an image processing system.

According to an exemplary embodiment, the image processing system includes a plurality of image sensors and an image processor, wherein the coordinator is included in the image processor, wherein a first image sensor is coupled to the image processor through one remote antenna and wherein a second image sensor is coupled to the image processor through the other remote antenna.

In exemplary embodiments, there is provided a method for V2X communications, comprising: providing two remote antennas positioned remotely from each other and communicatively coupled by digital connectivity, providing a coordinator communicatively coupled to the two remote antennas, and using the coordinator to synchronize operation of the two remote antennas.

According to an exemplary method embodiment, the using the coordinator to synchronize operation of the two remote antennas includes using the coordinator to perform periodic timing synchronization to determine a future transmission time for both remote antennas, set the future transmission time in each remote antenna, and, based on a CCA state, permit transmission at the set future transmission time or set a new future transmission time for both remote antennas.

In an exemplary embodiment, there is provided a coordinator communicatively coupled to two remote antennas connected by digital connectivity, the coordinator operative to synchronize operation of the two remote antennas.

According to an exemplary embodiment, the coordinator is configured to communicate a respective CCA state of each remote antenna to the other remote antenna, the respective CCA states used to synchronize the operation of the two remote antennas. The coordinator may be included in one of the two remote antennas, or it may be external to the two remote antennas.

BRIEF DESCRIPTION OF THE DRAWINGS

Aspects, embodiments and features disclosed herein will become apparent from the following detailed description when considered in conjunction with the accompanying drawings. Like elements may be numbered with like numerals in different figures.

DETAILED DESCRIPTION

Figure 1:
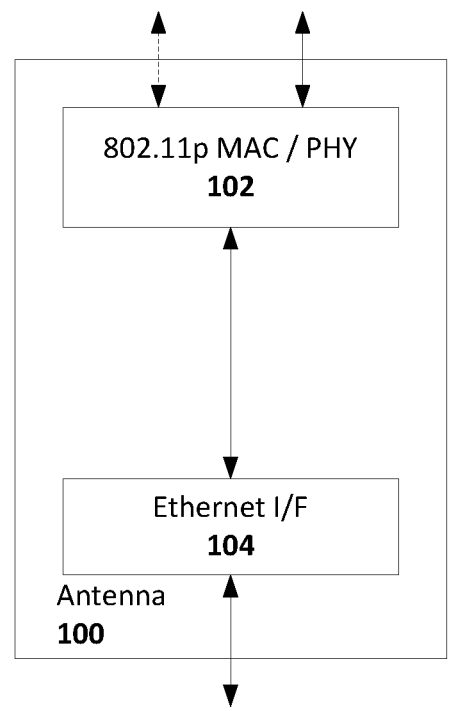
FIG. 1 shows schematically the structure of a known single antenna.
Figure 2A:
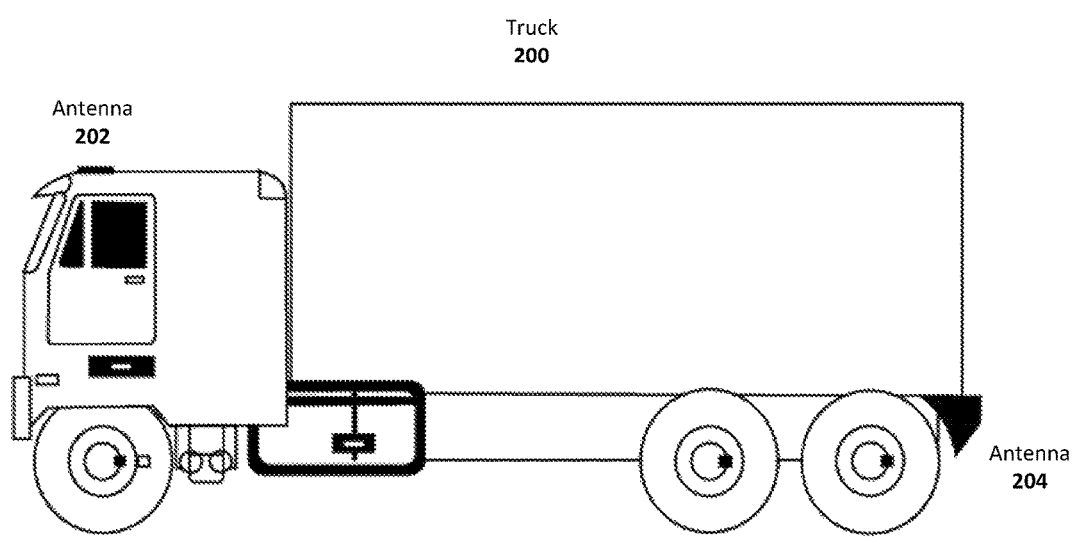
FIG. 2A shows a truck with two remote antennas positioned at, respectively, the front and the rear of the truck.
Figure 2B:
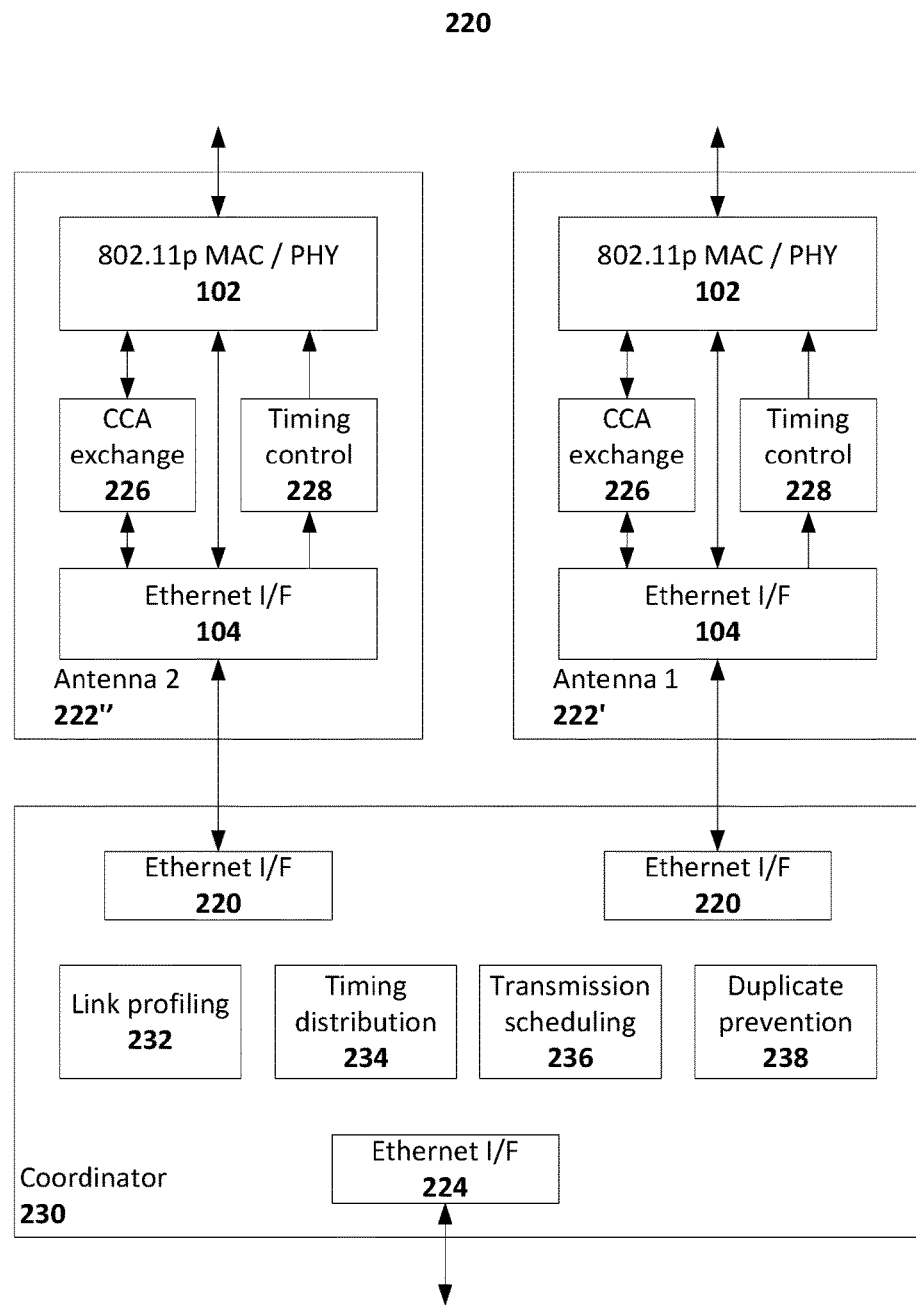
FIG. 2B shows, in an exemplary embodiment, a two-remote antenna communication system disclosed herein.

FIG. 2B shows a two remote antenna communication system numbered 220, according to an embodiment disclosed herein. The system is a V2X on-board unit (OBU) with remote antenna and digital connectivity, and may also be referred to as "V2X OBU". V2X OBU 220 comprises two antennas, Antenna 1 (222') and Antenna 2 (222"), connected to the protocol stack software layer via an Ethernet I/F 224. Each antenna includes a CCA exchange module 226 and a timing control unit 228 (implementable in hardware (HW) or as a combination of HW and software (SW)). Data arriving from Ethernet I/F 224 (from the protocol stack software layer) is transmitted over the air using two 802.11p MAC/PHY modems 102 and vice versa.

The two antennas are communicatively coupled by digital connectivity, exemplarily through respective Ethernet I/Fs 104 and respective Ethernet I/Fs 220 in a coordinator 230. Coordinator 230 synchronizes the operation of the two remote antennas. As used herein, "operation of remote antennas" refers to the synchronized (concurrent) transmission of the two remote antennas. The synchronized transmission aims to ensure that both antennas will transmit at the same time, minimizing the events in which one antenna transmits and the other does not transmit. Coordinator 230 also implements receive filtering, as described with reference to FIG. 9. Coordinator 230 includes, in addition to Ethernet I/Fs 220, a link profiling module 232, a timing distribution unit 234 (implementable in HW or as a combination of HW and SW), a transmission scheduling module 236, and a duplicate prevention module 238. The function of each of these units or modules is explained below. The coordinator may be physically located as part of a centralized entity such as ADAS (Advanced Driver Assistance Systems) or Telematics ECU (Electronic Control Unit), or may be part of (inside) either of antennas 222' and 222". Each antenna includes a vehicular communication modem 102 that implements (for example) the IEEE802.11p specification. Alternative communication protocols mediums may be used.

Figure 9:
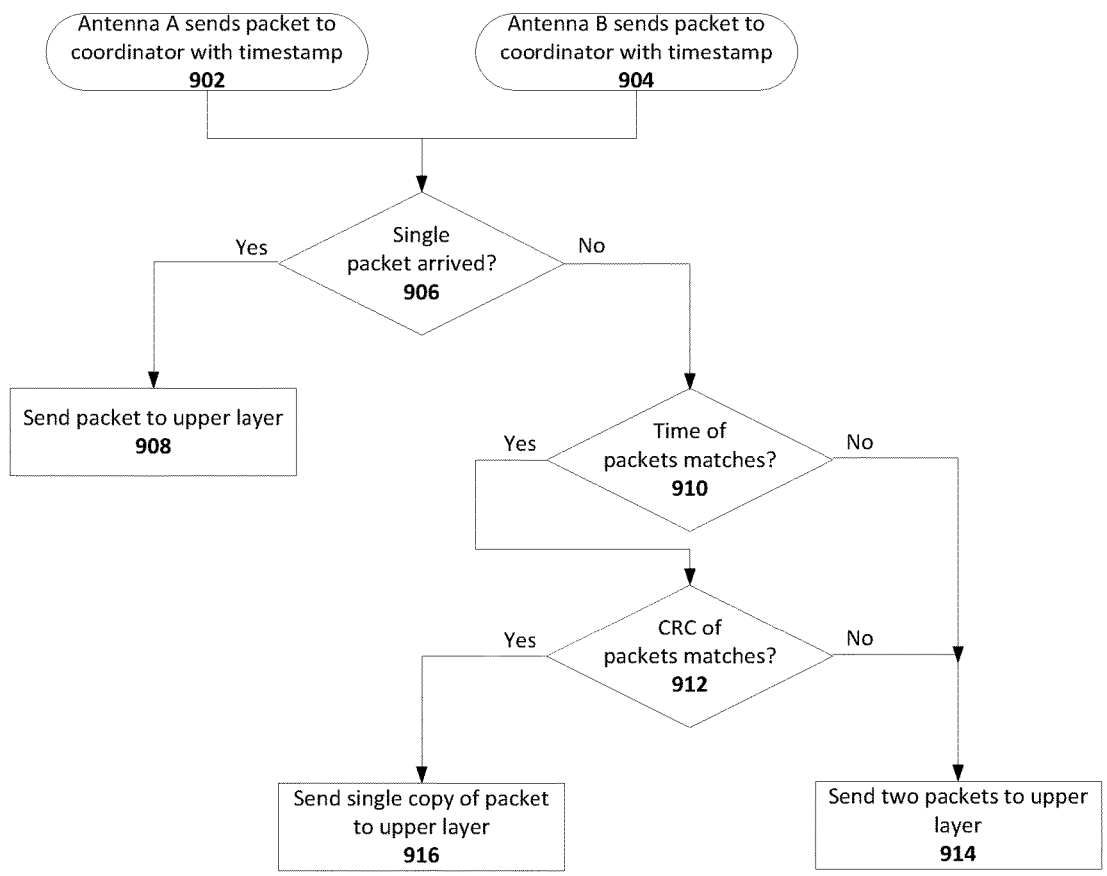
FIG. 9 illustrates in a flow chart an exemplary duplicate receive packet filtering.

The functionalities added for facilitating the remote antenna digital connectivity are:

a) Timing synchronization (see also FIG. 3), which comprises two actions: having a common time base (clock synchronization) and a common setting of transmission time (transmission scheduling). Having accurate timing is a precondition to allow the two antennas to synchronize. This is handled by timing control unit 228 in each antenna and by timing distribution unit 234 in the coordinator.

b) Transmit operation coordination, handled by real-time CCA exchange between the two antennas, through transmission scheduling module 236, and, optionally, link profiling module 232 in the coordinator, and through CCA exchange modules 226 in the antennas.

c) Receive filtering (see also FIG. 9 handled by duplicate prevention module 218.

Figure 3:
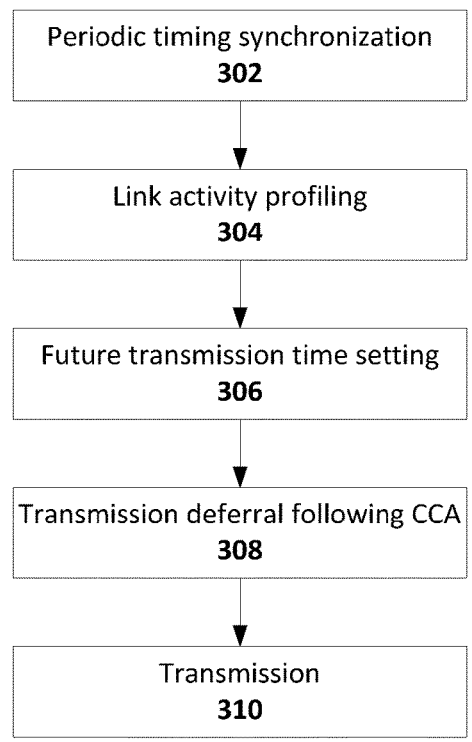
FIG. 3 illustrates schematically in a flow chart a high level view of an exemplary transmit operation coordination of transmission from the two remote antennas.

FIG. 3 illustrates in a flow chart a high level view of the transmit operation coordination of transmission from the two antennas. The transmit operation coordination involves timing control unit 228 and transmission scheduling module 236.

In step 302, periodic timing synchronization is performed by the coordinator. The timing synchronization is to assure concurrent transmission start time of the two antennas 222' and 222". Using transmission scheduling module 236, the coordinator sets a future transmission time in timing control unit 228 for transmission by each antenna.

In step 304 and optionally, link activity profiling performed by link profiling module 232 of the coordinator may be used to determine the optimal time for transmission, in which optimal time the likelihood of interferences is the lowest.

In step 306, a future transmission time (i.e. a time for a future planned transmission) is scheduled, distributed and set in timing control units 228 of both antennas by transmission scheduling module 236 of the coordinator.

In step 308, in case of real-time CCA detection (assertion), the future scheduled transmission is deferred (i.e. executed conditionally). Each antenna reports its real-time CCA status to the coordinator and informs the second antenna of a new transmission time via its CCA exchange module 226. If CCA is not asserted, then the transmission by each antenna is performed instantly and concurrently. If CCA is asserted, then operation "parks" in this step until CCA is de-asserted. Upon CCA assertion, the coordinator may cancel a pending transmission time, or may set a future time for transmission. The transmission by both antennas takes place concurrently in step 310.

The timing synchronization of step 302 is now described in more detail. The purpose of timing synchronization is to provide an accurate concurrent transmission start by both remote antennas. The basic time unit is 100 nS in IEEE802.11p and 50 nS in IEEE802.11n/ac. Therefore, a timing error of <25 nS would not be observed. The timing synchronization follows standard compliant distribution schemes, such as 802.1AVB or IEEE1588. The coordinator has an accurate reference clock (not shown) for example based on a 1 pulse-per-second (pps) signal from a GNSS receiver, and distributes the timing to each antenna using timing distribution unit 234. Timing control unit 228 in each antenna tracks the distributed clock, learning the clock drift, and synchronizes the internal antenna clock (not shown) with the system coordinator reference clock. The tracking accuracy depends on the available clock source. For example, the 160 MHz clock commonly available in WLAN implementations provides a 6 ns error.

The optional link activity profiling of step 304 is now described in more detail with reference to FIGS. 4A and 4B.

Figure 4A:
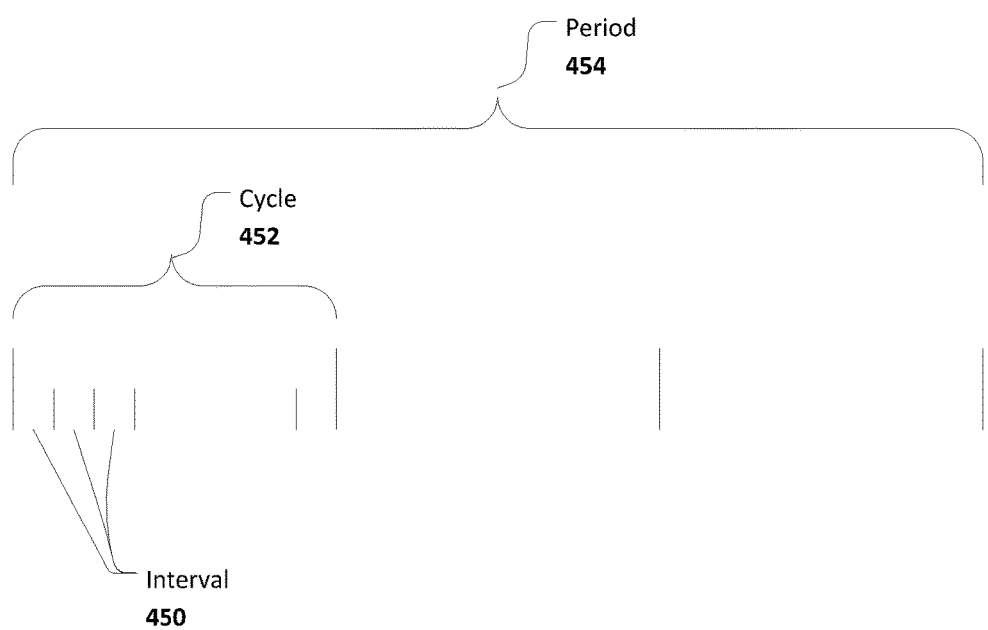
FIG. 4A illustrates timing definition of an exemplary link activity profiling.

FIG. 4A illustrates definitions of various timing terms used in link activity profiling. The profiling is performed over a cycle 452, which is selected to be 100 mS, which in SAE J2735 and SAE J2945 is the time separating two transmissions. Each cycle is divided into intervals 450, which are profiled to select the preferred interval for transmission. Multiple cycles 452 form a profiling period (or simply "period") 454, which is selected to be a random number for network stability.

Figure 4B:
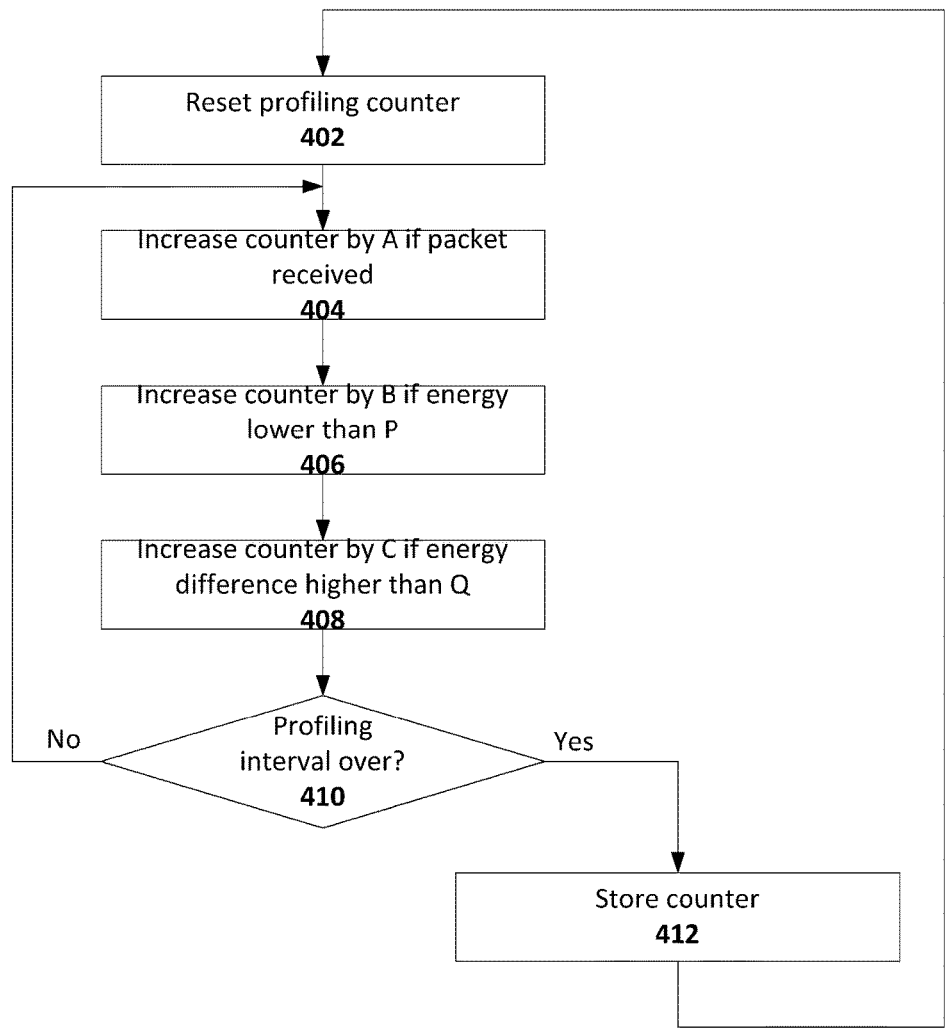
FIG. 4B illustrates in a flow chart an exemplary link activity profiling.

FIG. 4B illustrates in a flow chart an exemplary link activity profiling. Link profiling module 232 learns the probability of potential CCA misalignment (i.e. a CCA status of one antenna that conflicts with the CCA status of other antenna). A V2X basic safety message is transmitted periodically every 100 mS (as defined in the SAE J2735 US specification or the ETSI ITS G5 EU specification). Based on the profiling result, the timing of a future transmission may occasionally shift to an earlier slot (for example, 99 mS from the last transmission), a later slot (for example, 101 ms from the last transmission) or stay in the same slot. In the SAE 2745 specification and exemplarily, only periodic messages are transmitted and only the activity surrounding the scheduled transmission slots needs to be profiled. In the ETSI ITS G5 specification and exemplarily, immediate messages may be transmitted and full profiling of the time domain is needed.

The time domain is divided into intervals of T milliseconds (mS), where T is a factor of packet length, which is ~0.5 mS in Dedicated Short Range Communication (DSRC). T is measured arbitrary over a 100 mS cycle, i.e. has a value between 0 ms and 99 mS. High activity in a certain interval T leads to at least a 2 mS shift, hence learning activity at lower granularity does not serve for any useful purpose and is not necessary. The safest scenario of operation is idle activity. Both antennas can transmit without interferences. A still safe scenario, though less preferred, is CCA detected by both antennas, prohibiting both from transmission. An unsafe scenario occurs when CCA is detected at only one antenna, which may lead in some cases to transmission by only a single antenna.

The link activity profiling aims to decrease the probability of the unsafe scenario. The following parameters are taken into account:

a) Number of received packets: the lower the number of received packets, the higher the probability of successful transmission;

b) Energy of received packets: if the received packets energy is lower than an energy value ("sensitivity threshold") P, then the probability of misalignment is higher;

c) Energy difference between antennas: if the difference between the energies received at the two antennas is high, then the probability of misalignment is higher.

Upon beginning of a new profiling interval 450, a profiling counter (not shown but included in link profiling module 232) is reset in step 402. Typically, at least part of the profiling counter is implemented in HW. If a packet is received at either antenna, then the profiling counter is incremented by A (where a typical value of A is 1) in step 404. If the energy of the received packet is lower than an energy value P, then the profiling counter is increased by B in step 406. For example, P may equal −80 dBm and B may be set to 2. If the energy of a packet received at both antennas differs by more than an energy value Q, then the counter is increased by C in step 408. Typically, Q equals 8 dB and C equals 3, but other values are possible. The end of the profiling interval is checked in step 410. If not completed (No), operation resumes from step 404. Otherwise (Yes), operation continues to step 412, where the profiling counter is stored (representing the profiling result), and operation returns to step 402.

Figure 5:
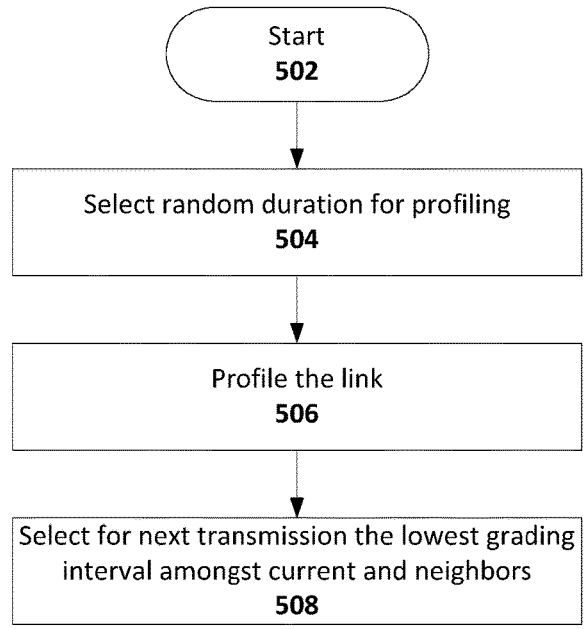
FIG. 5 illustrates in a flow chart an exemplary future transmit time setting procedure.

An exemplary future transmission time setting of step 306 is now described in more detail with reference to FIG. 5. Operation begins at step 502, where a profiling period 454 is selected. For example, the profiling period may be between 500 mS and 2 sec. In a basic default operation, the next transmission is scheduled 100 mS after the desired start of the current one. However, in case the profiling indicates a busy period, the transmit time can be changed. In order to prevent network instability, the transmit timing change should not be made in each cycle, but rather occasionally, with a random period 454 to avoid network synchronization. If all units will shift transmission timing immediately to an empty interval 450, then that interval will no longer be empty. A random number of cycles for delaying the action, for example a number of cycles between 4 and 10 or a period between 400 mS and 1 second, is selected in step 504. The link is profiled during this period in step 506. Once profiling ends, the interval with lowest grading (e.g. the profiled interval with the lowest value) among the current interval and the intervals immediately preceding it and following it is selected in step 508. The profiling is performed in a cyclical manner, per profiling period.

Figure 6:
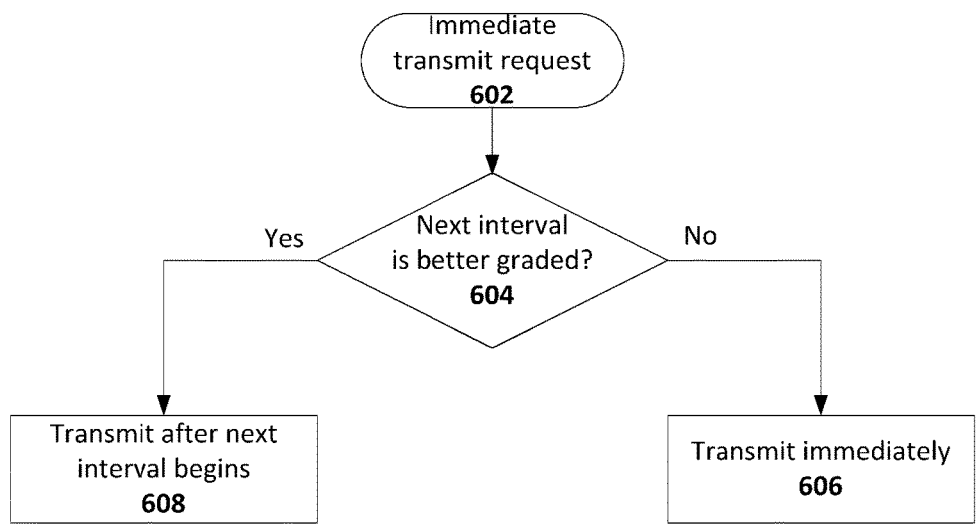
FIG. 6 illustrates in a flow chart in a flow chart an exemplary immediate transmission.

In case of an immediate transmission request, the flow chart of FIG. 6 is implemented each of the antennas. Operation begins at step 602 with a request for an immediate transmission by a protocol stack. A check is made in step 604 if a next interval is graded lower than the current one. If no, then transmission starts immediately in step 606. If yes, the transmission begins in step 608 after the next interval start.

Figure 7:
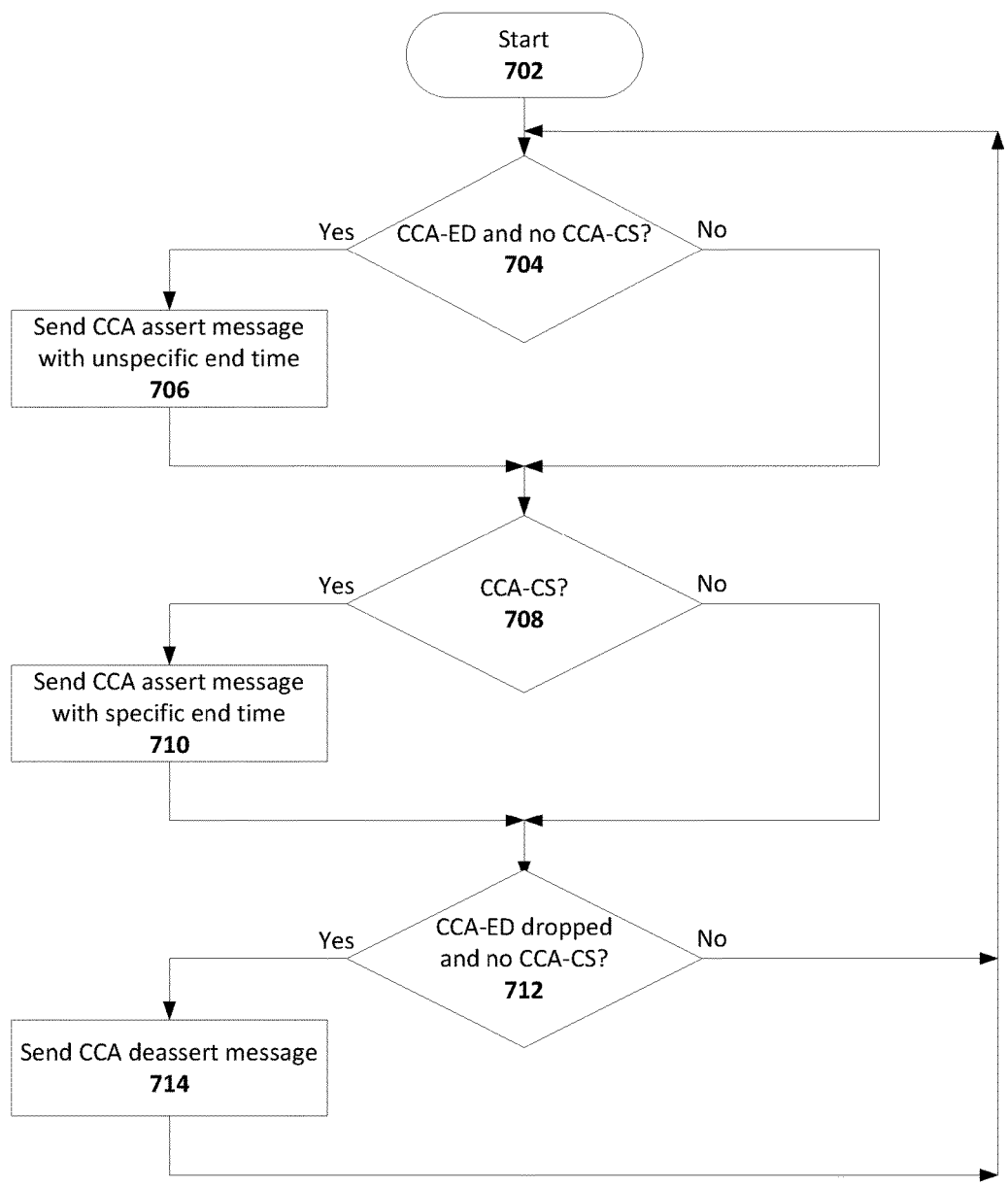
FIG. 7 illustrates schematically in a flow chart an exemplary transmission of CCA real-time data.

An exemplary transmission deferral following CCA of step 308 is now described in more detail with reference to FIG. 7, which shows schematically in a flow chart an exemplary transmission of CCA real-time data, as handled by the CCA exchange module 226. CCA information should be reported by each antenna to the other antenna as early as possible for allowing the coordinator to quickly adjust the transmission time. CCA-ED (where "ED" stands for Energy Detect, see IEEE802.11 specification) assertion (when energy is detected above a threshold (−65 dBm)) and no CCA-CS assertion (where "CS" stands for Carrier Sense, see IEEE802.11 specification) where the packet length is yet to be decoded or was not decoded properly, are performed in step 704 and immediately reported with a message without an expiration time in step 706. CCA-CS, asserted when length field is properly detected, is checked in step 708 and immediately reported by a message in step 710, specifying the expiration time according to the calculated packet length. A CCA-ED loss, when energy detection drops below the threshold (−65 dBm) without CCA-CS (meaning, no valid length detection) is asserted in step 712 and immediately reported by a CCA de-assertion message in step 714.

Figure 8:
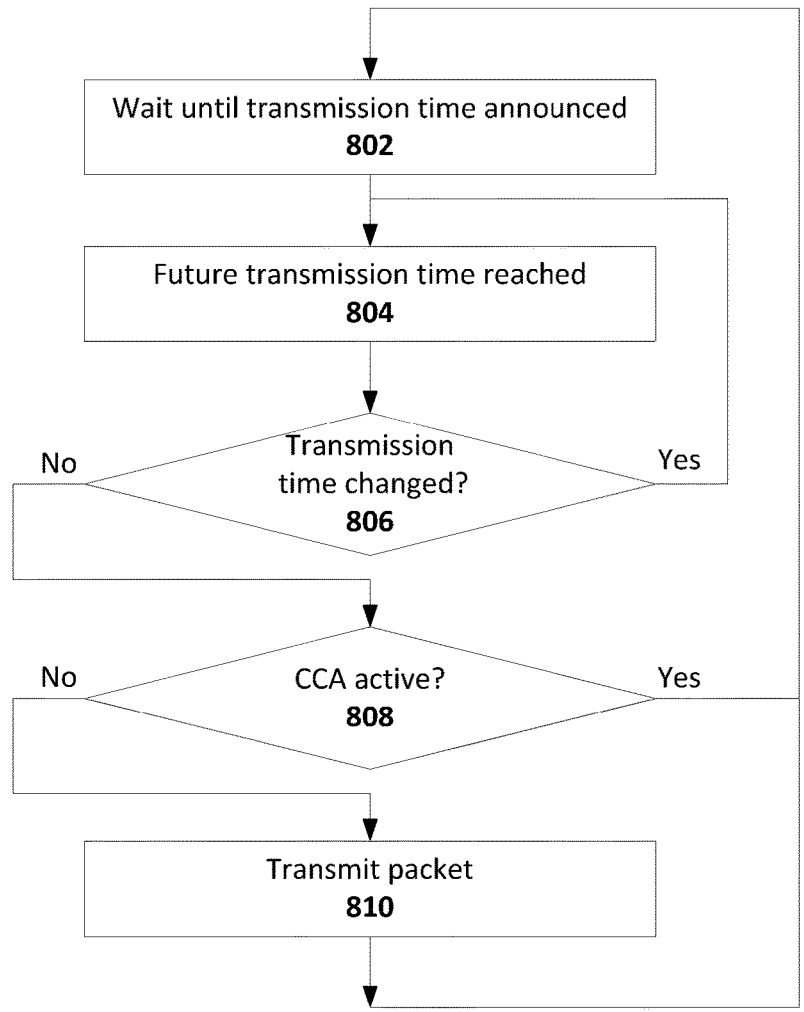
FIG. 8 illustrates in a flow chart an exemplary transmission operation.

The transmission operation of step 310 is now described in more detail with reference to FIG. 8. The figure shows schematically an exemplary transmission operation by either antenna, run by a state machine (timing control unit 228). The main goal is concurrent transmission from both antennas. Operation waits in step 802 until a transmission time is announced by transmission scheduling module 236. Afterwards, the transmission waits in step 804 until a future scheduled transmission time is reached. A check is made in step 806 if the transmission time changed. If yes, operation returns to step 804. If no, operation continues to step 808, where a check is made if CCA is active. If yes, operation returns to step 802. This scenario is the most undesired one, because the second antenna might have not detected CCA and it will transmit alone, as no transmission will take place from the first antenna. The probability of this event to happen depends on the link activity and distribution delay of CCA. Higher delay and higher activity worsen the probability.

If CCA was not active, then operation continues to step 810, where the packet is transmitted. The second antenna may not transmit due to CCA detection, but the first antenna is not aware that the second antenna does not transmit. Afterwards, operation resumes from step 802.

Receive Operation

The flow diagram of exemplary receive antenna filtering is depicted in FIG. 9. The purpose is to identify the cases in which the same packet was received in the two antennas and eliminate the duplication.

The first antenna sends the received packet to the coordinator with a timestamp in step 902. The second antenna does the same in step 904. The coordinator checks if only a single packet arrived in step 906. A delay in arrival time is allowed to accommodate implementation delays and digital link congestion. This delay may reach 1 mS. If only one packet arrives, then this packet is sent through Ethernet I/F 224 in step 908. Otherwise, the arrival time of both packets is compared in step 910. If a match is not found, then the two packets are different and both are sent to the communication stack (not shown) in step 914. The match should allow a minimal time difference, e.g. <1 μS. If a match is found, the CRC (Cyclic Redundancy Check) of packets is compared in step 912. If the CRC is identical, then packets are assumed to be identical, and only a single copy of the packet is sent to the communication stack in step 916. In theory, CRC can be identical for two different packets every $2^{-32}$ receptions, but the probability of that is added to the probability of two packets being received at the exact same time. If CRC is not identical, then step 914 is called, and the two different packets are sent to the communication stack of the recipient of the received packets.

System Architecture

A major advantage of the enablement of digital connectivity between two or more antennas as suggested herein is that it enables upgrading of existing Radar or of a camera Engine Control Unit (ECU) with V2X technology, allowing addition of V2X communications to a vehicle without increasing or changing the existing vehicle cabling. Vehicle cabling is considered to be a major problem in any vehicle design.

Figure 10A:
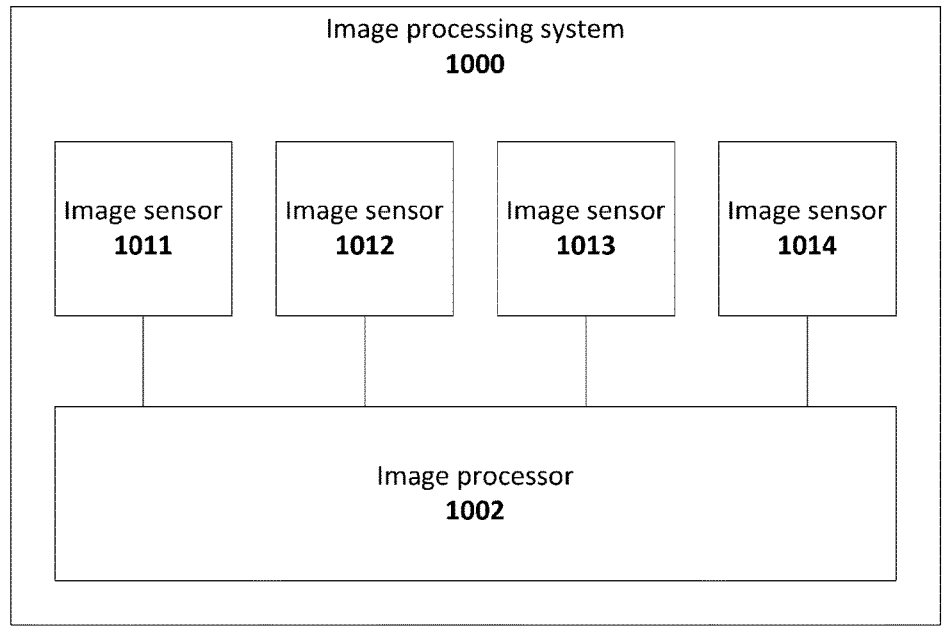
FIG. 10A illustrates a system diagram of a known image processing system.

An exemplary known image processing system 1000 having one or more ECUs is illustrated in FIG. 10A. A centralized image processor (i.e. ECU) 1002 is connected to multiple image sensors, exemplarily four image sensors 1011, 1012, 1013 and 1014. The number of sensors may change. The connectivity between the image sensors and the image processing unit may use LVDS (Low Voltage Differential Signal) or Ethernet interfaces.

Figure 10B:
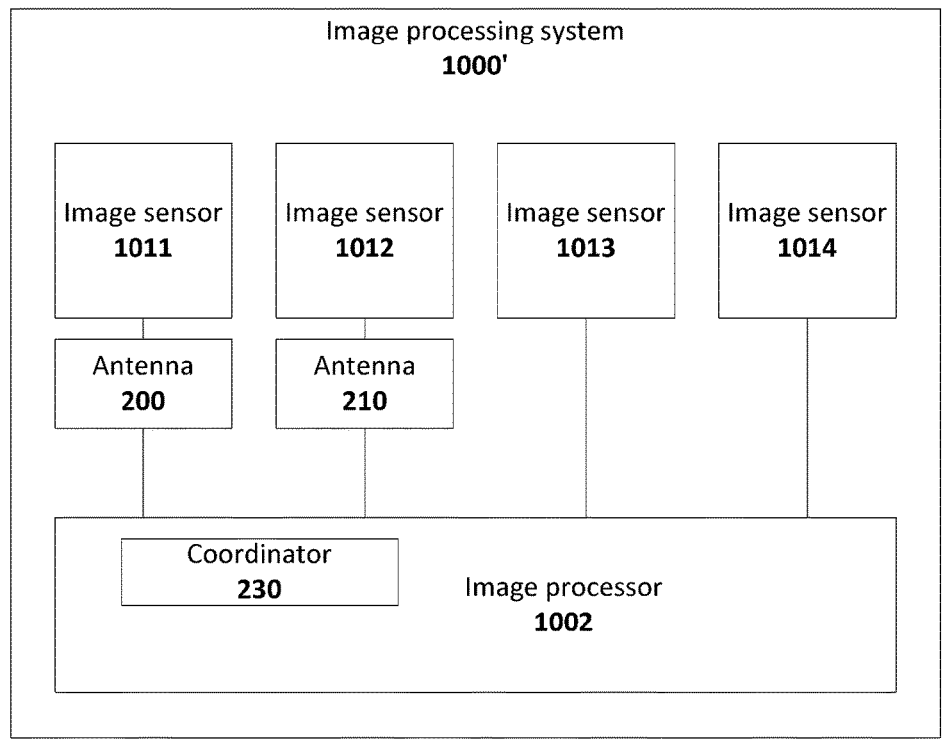
FIG. 10B illustrates a system diagram of an exemplary image processing system with V2X communication disclosed herein.

An enhanced image processing system located in several ECUs (with remote image sensors) according to an embodiment disclosed herein and numbered 1000' is illustrated in FIG. 10B. System 1000 is enhanced by adding V2X communication capabilities for the sharing the digital connectivity between sensors, as well as a processing unit for carrying the V2X communication signals. An antenna similar to antenna 222' or 222" is placed between sensor 1011 and an image processor 1002, and similarly, another antenna 222' or 222" is placed between the sensor 1012 and image processor 1002. The functionality of coordinator 230 is embedded inside image processor 1002.

Assuming that Ethernet will be used because of its cost and flexibility, we add V2X capabilities to at least one of the sensors and feed the V2X data to the image processor, which may run the V2X communication protocol stack or just forward received messages to another unit that will run the V2X protocol stack. Note that V2X capabilities as described herein may be added to more than one sensor.

Figure 11:
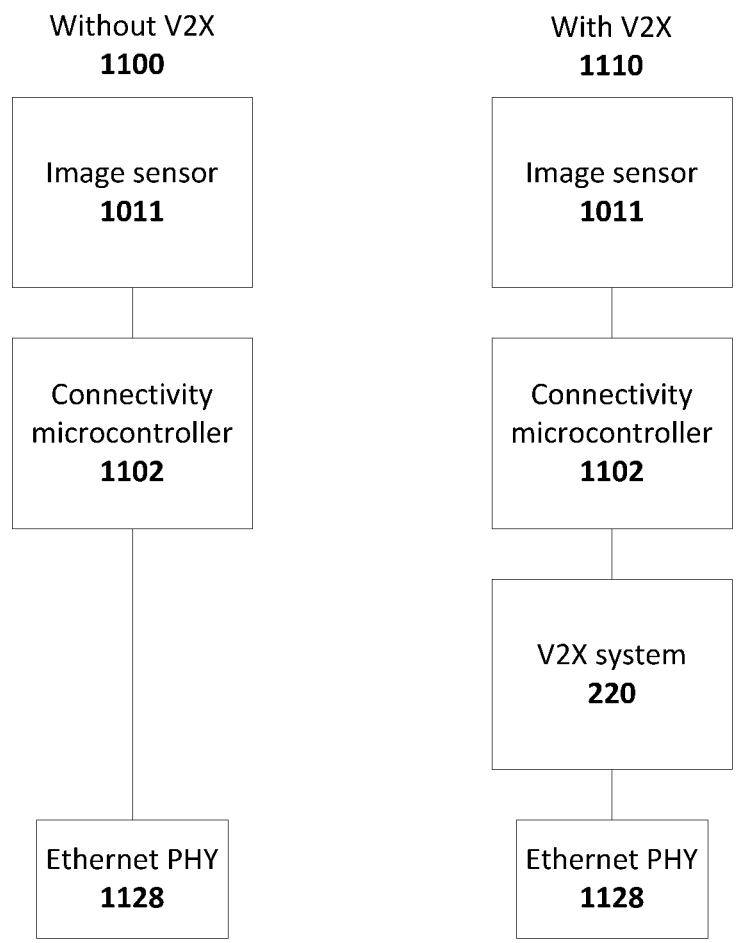
FIG. 11 shows on the left side a system diagram of known image processing without V2X digital connectivity), and on the right side a system diagram of enhanced image processing with V2X digital connectivity according to an embodiment disclosed herein.

Assume that in one example, two of the image sensors above (for example 1011 and 1012) are used to add V2X connectivity to a vehicle. FIG. 11 shows on the left side a system diagram of known image processing without V2X digital connectivity 1100 and on the right side a system diagram of enhanced image processing with V2X digital connectivity 1110, according to an embodiment disclosed herein. Referring now to the right side 1110, image sensor 1011 is located next to a connectivity microcontroller MCU 1102, which is responsible for managing Ethernet connectivity by connecting to an Ethernet PHY 1128. V2X OBU 220 is added between MCU 1102 and Ethernet PHY 1128, providing V2X capability with minimal changes. The V2X OBU 220 has two Ethernet interfaces, one toward connectivity MCU 1102 and the other toward Ethernet PHY 1128.

The various features and steps discussed above, as well as other known equivalents for each such feature or step, can be mixed and matched by one of ordinary skill in this art to perform methods in accordance with principles described herein. Although the disclosure has been provided in the context of certain embodiments and examples, it will be understood by those skilled in the art that the disclosure extends beyond the specifically described embodiments to other alternative embodiments and/or uses and obvious modifications and equivalents thereof. Accordingly, the disclosure is not intended to be limited by the specific disclosures of embodiments herein.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to an embodiment of the method disclosed herein. The techniques necessary to achieve this are well known to those skilled in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing embodiments of a method disclosed herein. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the invention, which are, for clarity, described in the context of separate embodiments or example, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

What is claimed is:

1. Apparatus for vehicle-to-everything (V2X) communications, comprising:
   a) two remote antennas, positioned remotely from each other and communicatively coupled by digital connectivity in which only un-modulated signals are exchanged between the two remote antennas, wherein each antenna includes a Media Access Control (MAC)/Physical (PHY) modem; and
   b) a coordinator communicatively coupled to the two remote antennas and operative to synchronize operation of the two remote antennas, wherein the coordinator includes an Ethernet interface and wherein both MAC/PHY modems are communicatively coupled to the coordinator Ethernet interface and are used to synchronously transmit a V2X message that arrives from the coordinator as decoded data.

2. The apparatus of claim 1, and wherein the coordinator includes a transmission scheduling module configured to schedule a concurrent future transmission time for the two remote antennas.

3. The apparatus of claim 2, and wherein the coordinator further includes a timing distribution unit for distributing the concurrent future transmission time for the two remote antennas.

4. The apparatus of claim 3, wherein each remote antenna includes a timing control unit for receiving the future transmission time and for setting the future transmission time in the remote antenna.

5. The apparatus of claim 1, wherein the coordinator includes a duplicate prevention module configured to ensure that only a single copy of a packet is received from both remote antennas.

6. The apparatus of claim 2, wherein each remote antenna further includes a Clear Channel Assessment (CCA)

exchange module for exchanging a CCA state with the other remote antenna through the coordinator.

7. The apparatus of claim 6, wherein the coordinator includes a link profiling module configured to establish an optimal time interval that includes the concurrent future transmission time.

8. The apparatus of claim 7, wherein the link profiling module is further configured to establish the CCA state at each remote antenna, the CCA state used to determine the optimal time interval.

9. The apparatus of claim 1, wherein each remote antenna includes a respective Ethernet interface and wherein the coordinator includes two Ethernet interfaces for communicatively coupling the two remote antennas through their respective Ethernet interfaces.

10. The apparatus of claim 1, included in an image processing system.

11. The apparatus of claim 10, wherein the image processing system includes a plurality of image sensors and an image processor, wherein the coordinator is included in the image processor, wherein a first image sensor is coupled to the image processor through one remote antenna and wherein a second image sensor is coupled to the image processor through the other remote antenna.

12. Method for vehicle-to-everything (V2X) communications, comprising:
 a) providing two remote antennas positioned remotely from each other and communicatively coupled by digital connectivity in which only un-modulated signals are exchanged between the two remote antennas, wherein each antenna includes a MAC/PHY modem;
 b) providing a coordinator communicatively coupled to the two remote antennas, wherein the coordinator includes an Ethernet interface and wherein both MAC/PHY modems are communicatively coupled to the coordinator Ethernet interface; and
 c) using the two MAC/PHY modems to synchronously transmit a V2X message that arrives from the coordinator as decoded data.

13. The method of claim 12, wherein the using the coordinator to synchronize operation of the two remote antennas includes using the coordinator to:
 i. perform periodic timing synchronization to determine a future transmission time for both remote antennas,
 ii. set the future transmission time in each remote antenna,
 iii. decide on a transmission time for both remote antennas based on a Clear Channel Assessment (CCA) state of each remote antenna.

14. The method of claim 13, wherein the using the coordinator to decide on a transmission time for both remote antennas based on a CCA state of each remote antenna includes, by the coordinator, deciding on a transmission time based on an exchange of real-time CCA state of each remote antenna with the other remote antenna and on a check of CCA assertion at each remote antenna.

15. The method of claim 14, wherein the deciding includes deciding to perform transmission by each remote antenna instantly if CCA is not asserted at either remote antenna.

16. The method of claim 14, wherein the deciding includes deciding the future transmission time and wherein, upon CCA assertion at each remote antenna, deciding to cancel a pending transmission time or to set a new future transmission time.

17. A coordinator communicatively coupled to two remote antennas connected by digital connectivity, wherein the coordinator includes an Ethernet interface and is operative to synchronize operation of the two remote antennas, wherein each antenna includes a MAC/PHY modem, and wherein both MAC/PHY modems are communicatively coupled to the coordinator Ethernet interface and are used to synchronously transmit a V2X message that arrives from the coordinator as decoded data.

18. The coordinator of claim 17, configured to communicate a respective Clear Channel Assessment (CCA) state of each remote antenna to the other remote antenna, the respective CCA states used to synchronize the operation of the two remote antennas.

19. The coordinator of claim 18, included in one of the two remote antennas.

20. The coordinator of claim 18, external to the two remote antennas.

* * * * *